United States Patent [19]
Godard et al.

[11] Patent Number: 6,014,260
[45] Date of Patent: Jan. 11, 2000

[54] OPTICAL DEVICE FOR HOMOGENIZING A LASER BEAM

[75] Inventors: Bruno Godard, Les Ulis; Robert Stehle, La Garenne, both of France

[73] Assignee: Societe de Production et de Recherches Appliquees, Bois-Colombes, France

[21] Appl. No.: 09/000,001

[22] PCT Filed: Aug. 6, 1996

[86] PCT No.: PCT/FR96/01251

§ 371 Date: Jan. 21, 1998

§ 102(e) Date: Jan. 21, 1998

[87] PCT Pub. No.: WO97/07423

PCT Pub. Date: Feb. 27, 1997

[30] Foreign Application Priority Data

Aug. 11, 1995 [FR] France ................................. 95 09781

[51] Int. Cl.[7] ............................. G02B 27/10; G02B 3/02; G02B 7/02
[52] U.S. Cl. ........................ 359/619; 359/623; 359/719; 359/819
[58] Field of Search ..................................... 359/619, 621, 359/622, 623, 624, 625, 626, 819, 811

[56] References Cited

U.S. PATENT DOCUMENTS

| | | | |
|---|---|---|---|
| 4,293,190 | 10/1981 | Clover | 359/802 |
| 5,253,110 | 10/1993 | Ichihara et al. | 359/619 |
| 5,363,240 | 11/1994 | Miyashita | 359/625 |
| 5,414,559 | 5/1995 | Burghardt et al. | 359/623 |
| 5,610,733 | 3/1997 | Feldman et al. | 359/9 |

FOREIGN PATENT DOCUMENTS

| | | |
|---|---|---|
| 0266120 | 5/1988 | European Pat. Off. . |
| 2737806 | 2/1997 | France . |
| 2737814 | 2/1997 | France . |
| 3634847 | 4/1987 | Germany . |
| 4220705 | 1/1994 | Germany . |
| 1286478 | 11/1989 | Japan . |
| 1052956 | 12/1989 | Switzerland . |

*Primary Examiner*—Georgia Epps
*Assistant Examiner*—Saud Seyrafi
*Attorney, Agent, or Firm*—Christie, Parker & Hale, LLP

[57] ABSTRACT

An optical device for homogenizing a laser beam is described. Such a device is commonly used in the surface treatment of an object. The device consists of front lenses that are bonded together to form an assembly of lenses that breaks the laser light into multiple beams. This results in the homogenization of the gaussian profile of the beam intensity as viewed perpendicular to the beam's propagation. Advantageously the matrix of lenses is formed using groves or bevels in a manner that minimizes losses resulting from light impinging on glue disposed upon the entire lateral surface of the front lenses. In the invention gaps between front lenses that cause interference with the light path are eliminated. This gap free bonding is accomplished by filling the groves or bevels with glue, inserting a rod or wire into the grove to assemble the front lenses in a support frame, bonding a grill to assembled front lenses, or by using a combination of gluing with a support frame.

17 Claims, 4 Drawing Sheets

OPTICAL DEVICE FOR HOMOGENIZING A LASER BEAM

FIELD OF THE INVENTION

The present invention concerns a device for homogenizing a laser beam.

It finds a general application in any technical field using a laser, and notably in laser surface treatment, such as the annealing of amorphous silicon, cleaning, polishing and surface preparation, notably.

BACKGROUND OF THE INVENTION

In general terms, the energy distribution across the cross section of a laser beam, at least in the lowest type of emission, has a gaussian appearance, which is in any case variable across the cross section of the beam.

However, in order to obtain, for example, an optimum annealing of amorphous silicon, it is necessary to apply a laser beam having a homogeneous and substantially uniform energy distribution.

This homogeneity is particularly required when the sample to be treated by laser is of large size (as described in the French Patent Application entitled "Device and method for laser surface treatment" filed in the name of the Applicant on Aug. 11, 1995, under the number 95 09778, and is incorporated herein by reference. It is also required when the incident laser beam is a combination of several laser beams coming from a line of laser units arranged in parallel and/or in series (as described in the French Patent Application entitled "Method and device for controlling a laser source with several laser units for optimizing laser surface treatment", also filed in the name of the Applicant on Aug. 11, 1995, under the number 95 09780, and is incorporated herein by reference.

Means for homogenizing a laser beam are already known.

For example, the document EP-A-0 266 120 or the document U.S. Pat. No. 5,253,110 describes a homogenizer which comprises a matrix of contiguous front lenses, disposed in m rows and n columns, perpendicularly to the direction of propagation of the laser beam to be treated, and able to divide the said laser beam into m×n laser beams each having a substantially geometrical uniform cross section, and a substantially homogeneous energy distribution.

In the document EP-A-0 266 120, at least one convergent collection lens, disposed perpendicularly to the direction of propagation of the light beam, downstream of the front lenses in the direction of travel of the laser beam, focuses, in a given area of a chosen plane, the beams coming from the front lenses.

In the documents referred to above, the matrix of lenses comes from a single piece machined to the format of the said matrix. It gives a plurality of laser beams each having a uniform and substantially identical intensity.

The drawback of such a matrix of lenses, formed of a Single piece, is that it makes it necessary to change the entire matrix when only one of the lenses is defective. In addition, the format of the matrix and the number of lenses are fixed. Such a matrix can, therefore, be suited only to a single size of laser beam to be homogenized.

Lenses assembled by bonding are known (CN-A-1 052 956), but this assembly does not deal with all light beams, owing to the glue disposed on the whole lateral surface of the faces of the lenses placed edge to edge. The adhesive is a cause of loss in the light transmission.

Furthermore, it can be destroyed by the power of the incident laser beam which irradiates it, lose its bonding properties or cause damage to the lenses.

Lenses are also known which are assembled individually by clamping in housings (DE-A-3 634 847), but this assembly also interferes with the path of the light beams, owing to the gaps separating the lenses.

SUMMARY OF THE INVENTION

The present invention affords a solution to these problems. It relates to an optical device for homogenizing a laser beam.

According to a general definition of the invention, it comprises means of assembly by bonding and/or clamping able to connect the front lenses to each other individually edge to edge, without gaps, the said assembly means comprising adhesive and/or clamping elements as well as grooves and/or bevels formed in the lenses to serve as a housing for the said adhesive and/or for the said clamping elements so that the said assembly means do not interfere with the path of the light beam passing through the said front lenses thus connected.

Such a device makes it possible to replace a defective front lens without changing the entire set of front lenses. It also improves the maintenance of the said lenses as well as their adaptation to laser beams of different sizes. In particular, it enables lenses to be assembled individually without loss of light and without interfering with the travel of the light beams by virtue of the grooves and/or bevels which eliminate the gaps, serving as a housing for the glue and/or clamping elements.

The device according to the invention thus finds an advantageous application when the beam to be homogenized is a combination of several laser beams emanating from a line of laser modules placed in series and/or in parallel.

In practice, each front lens has an overall parallelepipedal shape with an entry face, an exit face and four lateral faces. In this case, at least one lateral face on a front lens designed to be connected to a lateral face of an adjacent front lens comprises a transverse groove and/or a bevel respectively formed in the vicinity of and/or on the exit face of the said front lens.

According to a first embodiment of the invention, the assembly means are by bonding, the grooves and/or bevels being designed to serve as a reservoir for adhesive so as to avoid interfering with the path of the light beams which pass through the lenses thus bonded.

According to a second embodiment of the invention, the assembly means are by clamping, the grooves and/or bevels being designed for the insertion of a wire or rod fixed to a frame surrounding the plurality of front lenses.

According to another aspect of the invention, the assembly means comprise a grille having a plurality of bars with a width which is small compared with that of the front lenses and to which the exit faces and/or bevels of the front lenses are applied by bonding and/or clamping.

In practice, the front lenses are of the convex/plane, biconvex or convex/concave type, and are convergent or divergent.

Other advantages and characteristics of the invention will be described in the following detailed description and the drawings.

DETAILED DESCRIPTION OF THE INVENTION

Figure 1:
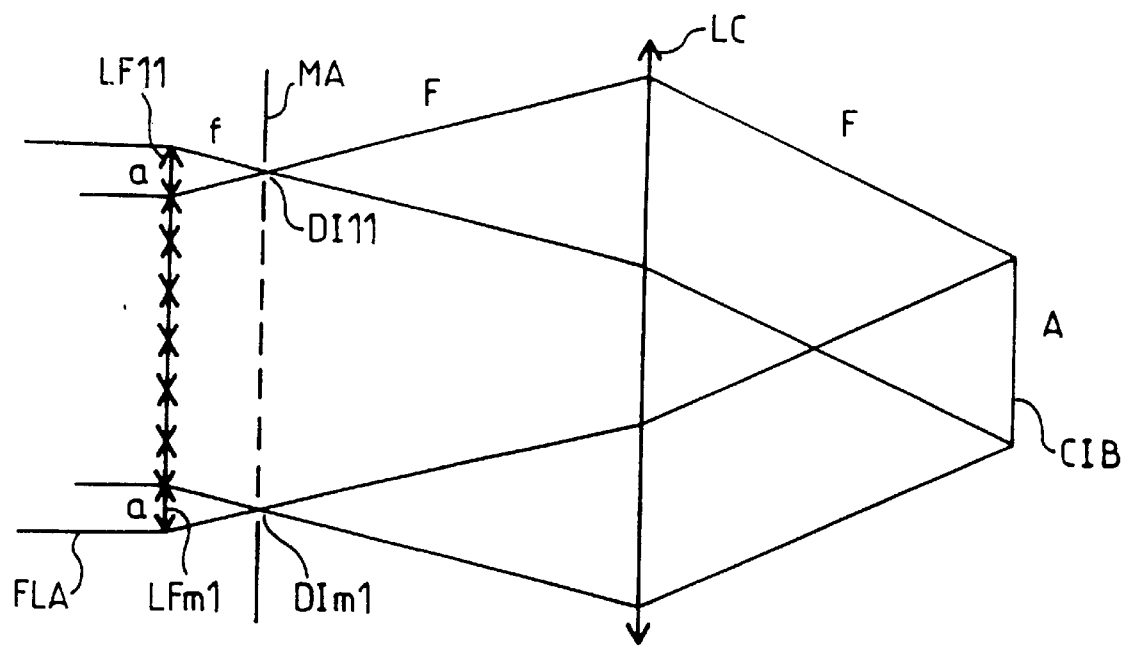
FIG. 1 is a schematic representation of the essential means of a homogenizer.

In FIG. 1, the reference FLA designates the light beam to be homogenized. This laser beam has an energy distribution which is nonuniform in cross section. It emanates for example from a laser or from a line of laser modules placed in parallel or in series.

For example, this laser beam is intended for annealing amorphous silicon by laser. One application consists of illuminating a large panel of amorphous silicon for the manufacture of flat liquid crystal screens. This laser beam is applied to the target plane CIB carrying the sample to be treated.

The optical device for homogenizing a laser beam comprises here m×n contiguous front lenses LF, disposed in m rows and n columns perpendicularly (transversely) to the direction of propagation of the laser beam to be treated. m and n are integer numbers, for example m and n are equal to 7. The front lenses are arranged in a straight or oblique rectangular matrix. For example, they are evenly distributed within a rectangle or parallelogram.

These lenses split the laser beam FLA into m×n laser beams each having a substantially uniform cross section and a substantially homogeneous energy distribution.

A convergent collection lens LC is provided, disposed perpendicularly to the direction of propagation of the light beam, and downstream of the front lenses LF in the direction of travel of the laser beam. This collection lens is able to focus, in the target plane CIB, the beams coming from the front lenses.

Advantageously, m×n diaphragms DI are associated respectively with the m×n front lenses. Each diaphragm is disposed substantially in the object focal plane of the associated lens and receives the light beam coming from the associated front lens in order to filter it spatially.

The reference "a" designates the width of a front lens LF. The reference f designates the focal distance (close to the draw tube) between a front lens and the associated diaphragm DI. The reference F designates the distance (which can be different from the focal distance) between a diaphragm DI and the collection lens LC. The reference A designates the width of the homogenized laser beam obtained by the homogenizer HO at the plane CIB. The dimension A is equal to a×F/f.

Each diaphragm DI comprises an opening of chosen shape and dimensions, for example circular. A support or mask MA holds the plurality of diaphragms.

The front lenses are for example of the convex/plane, biconvex or convex/concave type, and convergent or divergent.

It is here arranged so that the cross section of the light beam coming from each front lens is rectangular or hexagonal, downstream of the diaphragms.

When the collection lens LC is of small diameter, the optical device is less expensive and has fewer optical aberrations than with a large collection lens.

Figure 2:
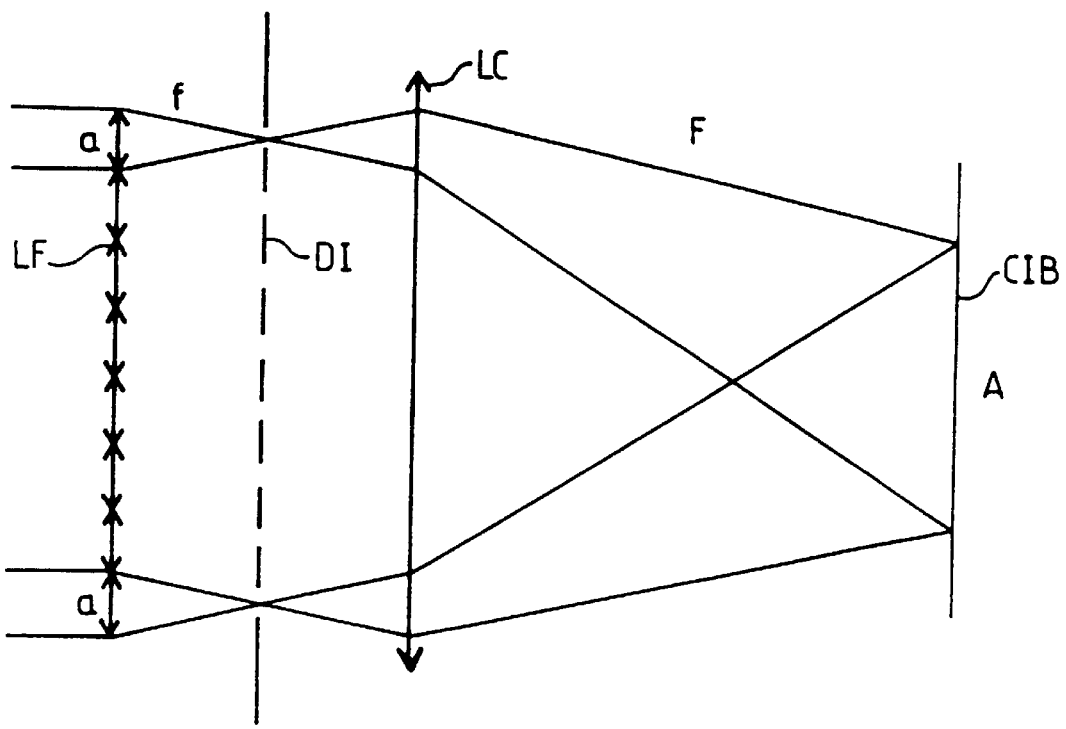
FIG. 2 is a variant of the homogenizer described with reference to FIG. 1.

In FIG. 2, the collection lens LC is disposed so that the focal plane of the lenses LF is not merged with that of the collection lens LC. This variant confers a reduction in bulk of the homogenizing device.

The path of the light rays shows here that the homogenizing device is not necessarily a focal.

Figure 3:
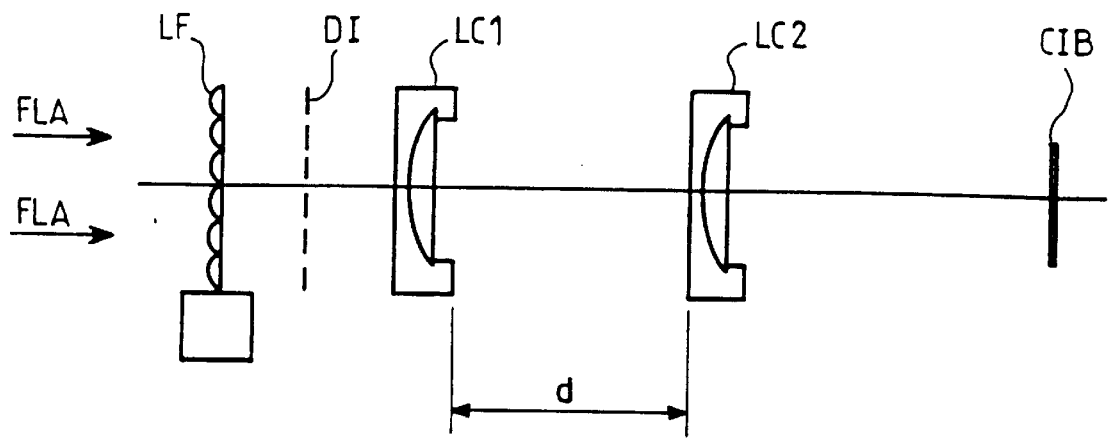
FIG. 3 is a homogenizer with two collection lenses.

With reference to FIG. 3, the collection lens LC is replaced by two convergent lenses LC1 and LC2, disposed perpendicularly to the direction of propagation of the light beam, downstream of the front lenses LF and associated diaphragms DI.

These collection lenses LC1 and LC2 are able to move in translation along the optical axis.

The distance d between the two lenses LC1 and LC2 is varied in order to vary the resulting focal distance and obtain, at the target plane CIB, a size of homogenized beam which is suited to the chosen application, for example the size of the panels to be treated in the case of the annealing of amorphous silicon.

It should be noted that the other optical elements, namely the front lenses LF, the diaphragms DI and the target plane CIB, can also be movable in translation along the optical axis.

The choice of the relative distances between the different optical elements makes it possible not only to adapt the size of the homogenized laser beam to the chosen application (the possibility of choosing the magnification by varying the distance d), but also to reduce the bulk of the homogenizing device.

It should also be noted that the choice of the distance d also makes it possible to adjust the energy per unit surface delivered by the laser beam, as described in the patent application filed by the Applicant for "Method and device for controlling a laser source with several laser units in order to optimize laser surface treatment" as mentioned above.

Figure 4:
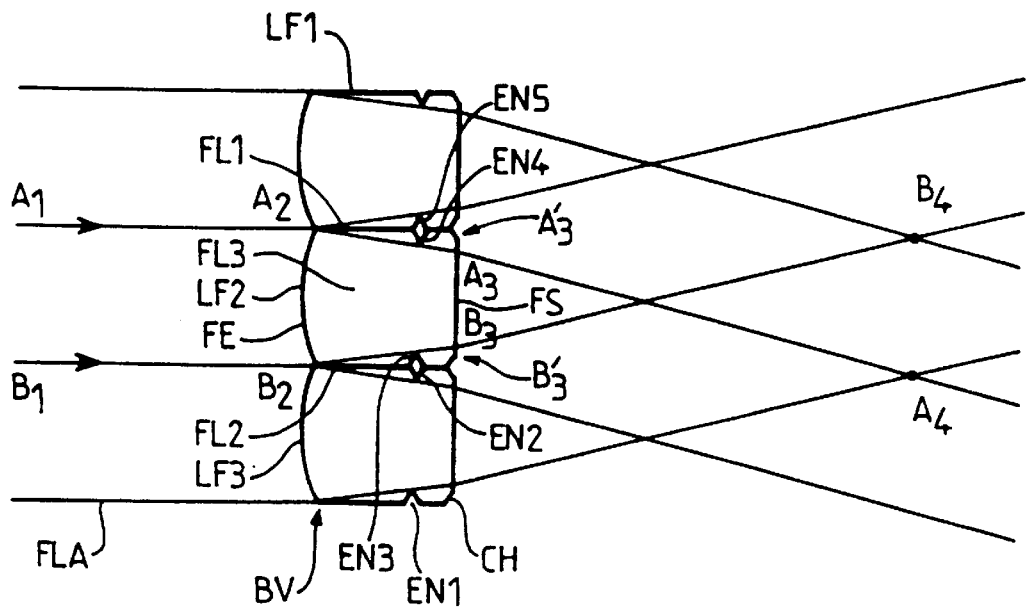
FIG. 4 illustrates the connection by bonding of the front lenses of the convex/plane type according to the invention.

FIG. 4 depicts the path of several beams through several front lenses LF on the same row m. In order to facilitate an understanding of the invention, only three front lenses are shown diagrammatically, alongside each other. These front lenses are for example of convex/plane type. They are of parallelepipedal shape overall, with an entry face FE, an exit face FS and four lateral faces FL1 to FL4. The convex part (the entry face) receives the laser beam to be treated FLA. One lateral face of a front lens is defined for example by the points A2, A'3, B'3 and B2 for the lateral face FL3 of the central lens LF2.

The laser beam to be treated, coming from the point A1, is applied to the central lens LF2 at the point A2. This beam passes through the front lens LF2 as far as the point A3, and is then routed towards the point A4. It should be noted that the point A3 is slightly offset with respect to the point A'3.

The convex part of a front lens comprises here two sharp edges such as BV.

According to the invention, the front lens LF2 comprises a shallow groove EN4 formed transversely in the lateral face FL1.

Likewise, the front lens LF2 comprises a shallow groove EN3 formed transversely in the lateral face FL2.

The grooves are preferably formed close to the exit face of the front lens.

The same applies to the other front lenses.

The two adjacent front lenses LF2 and LF3 are applied against each other. The cooperation of the respective grooves EN3 and EN2 enables the said lenses to be bonded by applying adhesive in grooves EN3 and EN2, without interfering with the optical properties of the light beams passing through the said front lenses LF2 and LF3.

The path of the beam B1 through the central front lens LF2 passes through the points B2, B3 and B4.

It should be noted advantageously that the light path is not disturbed by the grooves EN and bevels CH.

The front lenses are rectangular or hexagonal in shape overall, with sides with a length of around 1 cm.

For example, the beam to be homogenized FLA is rectangular with sides of around 5 to 8 cm.

Figure 5:
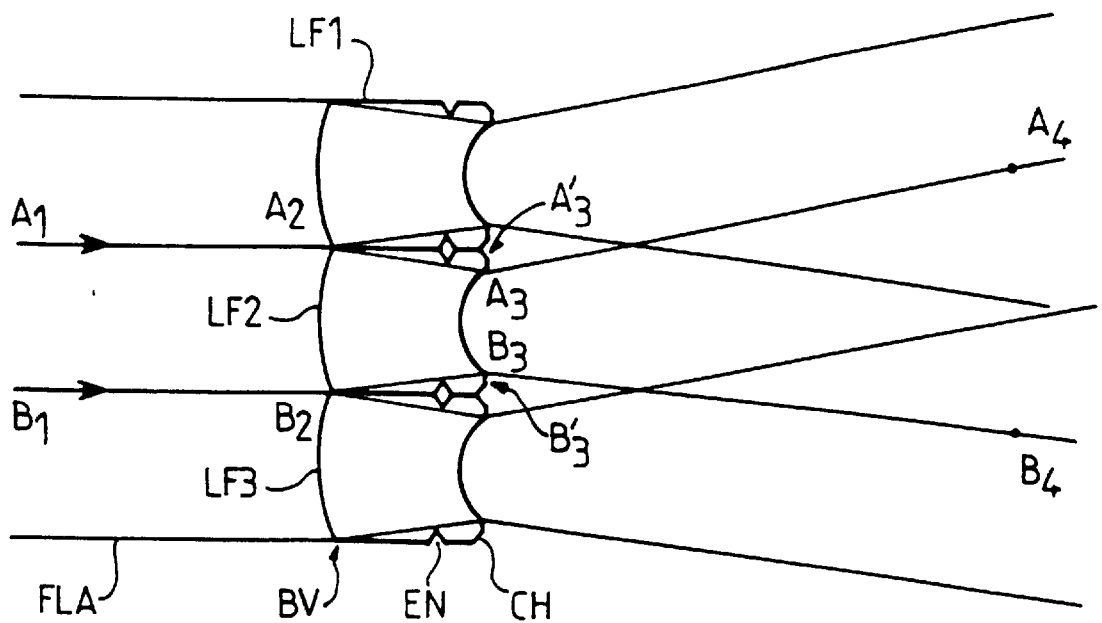
FIG. 5 illustrates the connection by bonding of the front lenses of the convex/concave type according to the invention.

With reference to FIG. 5, the connection by bonding of the front lenses according to the invention can be applied also to divergent front lenses of the convex/concave type.

It should be noted that the grooves described with reference to FIGS. 4 and 5 can also serve for the insertion of a wire or rod (not shown) fixed to a frame (not shown) surrounding the matrix of front lenses. These wires or rods thus inserted in the grooves make it possible to juxtapose and connect together the front lenses. These wires or rods can also be inserted and held in the grooves by bonding and/or clamping.

Figure 6:
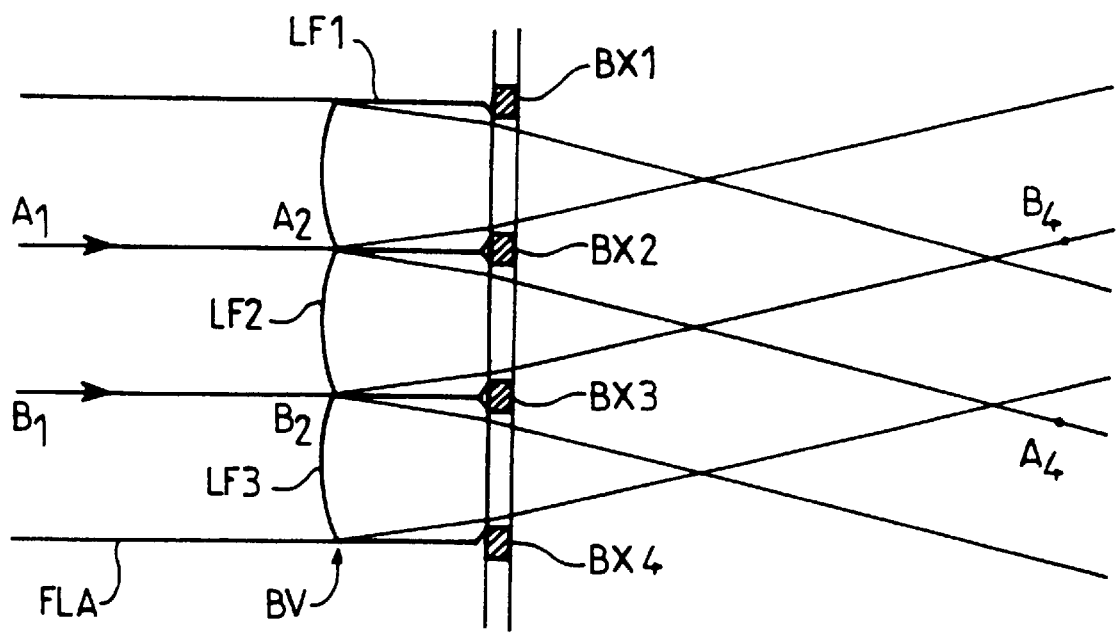
FIG. 6 illustrates the connection by clamping and/or bonding of the front lenses of the convex/plane type according to the invention.
Figure 7:
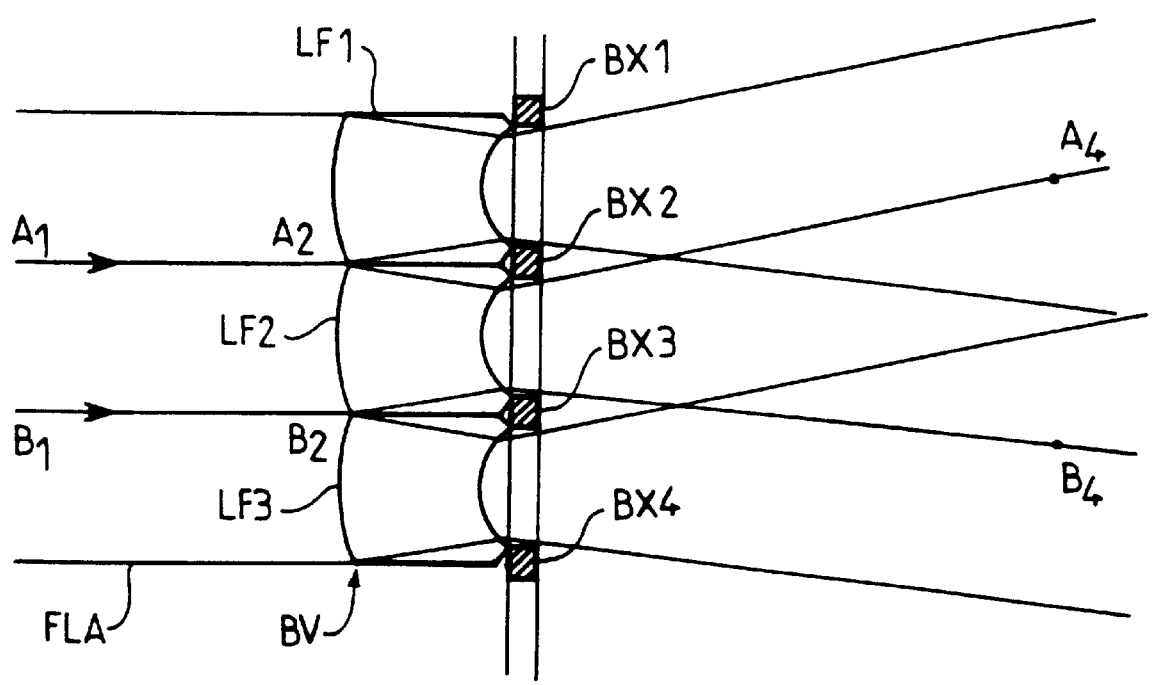
FIG. 7 illustrates the connection by clamping and/or bonding of the front lenses of the convex/concave type according to the invention.

With reference to FIGS. 6 and 7, the assembly means comprise a grille having a plurality of bars, depicted here at Bx1 to Bx4, of small width compared with that of the front lenses, and to which the exit faces of the front lenses are applied by bonding and/or clamping.

The grooves EN described with reference to FIGS. 4 and 5 can advantageously be omitted in the assembly according to FIGS. 6 and 7.

In FIG. 6, the front lenses are convergent and of the convex/plane type.

As a variant, according to FIG. 7, the front lenses are divergent and of the convex/concave type.

It is a question above of homogenizing the laser beam obtained at the exit. Although important applications entail the obtaining of a beam whose energy density per unit surface is uniform in cross section, it is clear that the word "homogenize" does not necessarily imply equality of the energy density over the entire cross section, but on the contrary extends to obtaining any desired distribution of this energy density.

We claim:

1. An optical device for homogenizing laser light, the device comprising:
   a plurality of contiguous front lenses with each front lens having a plurality of grooves and bevels formed in the front lenses to facilitate their assembly into a single unit, with the front lenses disposed in m rows and n columns in a plane perpendicular to the direction of propagation of the laser light and dividing the laser light being homogenized into m×n laser beams each having a desired distribution of laser light intensity; and
   a lens assembly structure for supporting the front lenses and holding them together edge to edge and without gaps, wherein the lens assembly structure does not interfere with the path of the laser light passing through the front lenses.

2. An optical device as claimed in claim 1, wherein each front lens has an overall parallelepiped shape with an entry face an exit face and four lateral faces.

3. An optical device as claimed in claim 1, wherein each front lens has an overall hexagon shape with an entry face an exit face and six lateral faces.

4. An optical device as claimed in claim 1, wherein the lens assembly structure comprises glue disposed in the grooves and bevels.

5. An optical device as claimed in claim 1, wherein the lens assembly structure comprises multiple supports disposed in the grooves of the front lenses and the supports are attached to a frame surrounding the front lenses such that the front lenses are held together within the frame.

6. An optical device as claimed in claims 5, wherein the supports are wires.

7. An optical device as claimed in claim 5, wherein the supports are rods.

8. An optical device as claimed in claim 1, wherein the lens assembly structure comprises supports disposed in the bevels of the front lenses and wherein the supports are attached to a frame surrounding the front lenses such that the front lenses are held together as a unit.

9. An optical device as claimed in claim 8, wherein the supports are wires.

10. An optical device as claimed in claim 8, wherein the supports are rods.

11. An optical device as claimed in claim 1, wherein the lens assembly structure comprises a grille having a plurality of bars which have a width which is less than the width of the two bevels being covered, the grill being bonded to the bevels at the exit faces of the front lenses.

12. An optical device as claimed in claim 1, wherein the lens assembly structure comprises a grille having a plurality of bars which have a width that is less than the width of the two bevels being covered, the grille securing the front lenses in place by clamping the grille to the exit faces.

13. An optical device as in claim 1, wherein the front lenses are arranged and wherein a cross section of laser light emanating from the front lenses in hexagonal.

14. An optical device as in claim 1, wherein the front lenses contain only bevels.

15. An optical device as in claim 1, wherein the front lenses are convergent.

16. An optical device as in claim 1, wherein the front lenses are divergent.

17. An optical device as in claim 1, wherein the cross section of homogenized laser light coming from the front lenses is rectangular.

* * * * *